(12) United States Patent
Kang

(10) Patent No.: US 9,500,835 B2
(45) Date of Patent: Nov. 22, 2016

(54) APPARATUS FOR DRIVING ACTUATOR OF CAMERA MODULE IN MOBILE DEVICE

(71) Applicant: SAMSUNG ELECTRO-MECHANICS CO., LTD., Suwon-si (KR)

(72) Inventor: Shin Jae Kang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 10 days.

(21) Appl. No.: 14/323,192

(22) Filed: Jul. 3, 2014

(65) Prior Publication Data

US 2015/0264237 A1 Sep. 17, 2015

(30) Foreign Application Priority Data

Mar. 12, 2014 (KR) ........................ 10-2014-0029166

(51) Int. Cl.
*G02B 7/00* (2006.01)
*H04N 5/225* (2006.01)

(52) U.S. Cl.
CPC .............. *G02B 7/00* (2013.01); *H04N 5/2257* (2013.01)

(58) Field of Classification Search
CPC .................... H04N 5/23248; H04N 5/23264; H04N 5/2328; H04N 5/23287
See application file for complete search history.

(56) References Cited

U.S. PATENT DOCUMENTS

| | | | | |
|---|---|---|---|---|
| 6,751,410 B1* | 6/2004 | Stavely | .................. | G03B 17/00 348/E5.046 |
| 2005/0031326 A1* | 2/2005 | Yamazaki | ............ | G02B 27/646 396/55 |
| 2006/0280493 A1* | 12/2006 | Kim | ........................ | G03B 3/10 396/133 |
| 2008/0012946 A1* | 1/2008 | Lee | .................... | H04N 5/23248 348/208.4 |
| 2008/0012950 A1* | 1/2008 | Lee | ..................... | H04N 5/23248 348/208.99 |
| 2008/0152332 A1* | 6/2008 | Koo | .................... | H04N 5/23248 396/55 |
| 2008/0195236 A1* | 8/2008 | Koo | ........................ | G05B 11/42 700/42 |
| 2009/0021610 A1* | 1/2009 | Lee | ..................... | H04N 5/2257 348/241 |
| 2009/0085558 A1* | 4/2009 | David | ................... | G01D 5/145 324/207.2 |
| 2010/0265343 A1* | 10/2010 | Lee | ...................... | G02B 27/646 348/208.7 |
| 2012/0063756 A1* | 3/2012 | Kang | ........................ | G03B 5/02 396/55 |
| 2012/0076343 A1 | 3/2012 | Arai | | |
| 2012/0163784 A1* | 6/2012 | Saito | .................... | G02B 27/646 396/55 |
| 2015/0160469 A1* | 6/2015 | Wakamatsu | ......... | G02B 27/646 348/208.11 |
| 2015/0181122 A1* | 6/2015 | Kang | ................. | H04N 5/23251 348/208.1 |
| 2015/0256731 A1* | 9/2015 | Ninomiya | .............. | H04N 5/238 348/208.11 |

\* cited by examiner

*Primary Examiner* — Timothy J Henn
(74) *Attorney, Agent, or Firm* — NSIP Law

(57) ABSTRACT

Embodiments of the invention provide an apparatus for driving an actuator of a camera module in a mobile device. The apparatus includes a proportional-integral-derivative (PID) controller configured to compare an output of a gyro sensor with an output of a hall sensor configured to sense a position of an actuator to output a digital signal of plural bits, and a differential current digital-to-analog converter configured to convert the digital signal output from the PID controller into an analog current signal. The apparatus further includes a linear driver configured to receive the signal output from the differential current digital-to-analog converter to output a linear driving signal, an H-bridge circuit configured to control magnitudes of a forward driving current and a reverse driving current flowing in the actuator based on the output of the linear driver, and a driving direction controller configured to output a signal controlling a direction of current flowing in the actuator to the H-bridge circuit based on the digital signal output from the PID controller.

15 Claims, 6 Drawing Sheets

APPARATUS FOR DRIVING ACTUATOR OF CAMERA MODULE IN MOBILE DEVICE

CROSS REFERENCE TO RELATED APPLICATION

This application claims the benefit of and priority under 35 U.S.C. §119 to Korean Patent Application No. KR 10-2014-0029166, entitled "APPARATUS FOR DRIVING ACTUATOR OF CAMERA MODULE IN MOBILE DEVICE," filed on Mar. 12, 2014, which is hereby incorporated by reference in its entirety into this application.

BACKGROUND

1. Field of the Invention

The present invention relates to an apparatus for driving an actuator of a camera module in a mobile device.

2. Description of the Related Art

A camera module in a mobile device, such as a smart phone, a tablet PC, and a camera has extendedly applied functions, such as an auto focus (AF) and an optical image stabilizer (hereinafter, referred to as an OIS) to obtain a high-definition image. Therefore, a linear current driving technology of an actuator, such as a voice coil motor (VCM) for low noise among core technologies for implementing the AF and OIS functions, has become increasingly important.

The VCM used to move a lens module in the AF and the OIS moves the lens module to a desired position by controlling the direction and amount of current flowing in a coil which is mounted outside a camera lens module.

U.S. Patent Publication No. 2012/0076343 describes a linear current driving of a VCM 3, in which the VCM includes a control circuit 11, a digital-to-analog converter 14, a driving circuit 15a including an operational amplifier 151 and an NMOS transistor 152, and a resistor R. The control circuit 11 outputs a digital code having any bit corresponding to a desired current value and the digital-to-analog converter 14 converts the digital code having any bit into an analog voltage. The analog voltage value converted by the digital-to-analog converter 14 is supplied to the resistor R through the driving circuit 15a and a driving current Ivcm flows through the NMOS transistor 152.

In this configuration, the resistor R needs to have a resistance value of approximately 0.5 to 1 ohm to obtain a driving current of 100 mA. However, the small resistance value is difficult to be accurately implemented within the actual IC and sensitively reacts to a temperature change and a process deviation, such that it is difficult to obtain stable performance.

SUMMARY

Accordingly, embodiments of the invention have been made to provide an apparatus for driving an actuator of a camera module in a mobile device capable of more accurately and rapidly controlling a position of an actuator by linearly controlling a forward and reverse current of the actuator using a differential current digital-to-analog converter and a linear driver, and capable of providing a linear current driving of an actuator based on a ratio of resistance values of several hundred ohms to several kilo ohms and a ratio of gate widths of transistors, which are less affected by a temperature change and a process deviation with respect to an output current of a differential current digital-to-analog converter.

According to an embodiment of the invention, there is provided an apparatus for driving an actuator of a camera module in a mobile device. The apparatus includes a proportional-integral-derivative (PID) controller comparing an output of a gyro sensor with an output of a hall sensor sensing a position of an actuator to output a digital signal of plural bits, a differential current digital-to-analog converter converting the digital signal output from the PID controller into an analog current signal, a linear driver receiving the signal output from the differential current digital-to-analog converter to output a linear driving signal; an H-bridge circuit controlling magnitudes of a forward driving current and a reverse driving current flowing in the actuator based on the output of the linear driver; and a driving direction controller outputting a signal controlling a direction of current flowing in the actuator to the H-bridge circuit based on the digital signal output from the PID controller.

According to an embodiment, the actuator includes a VCM.

According to an embodiment, the differential current digital-to-analog converter outputs a forward differential current signal and a reverse differential current signal of which the magnitudes of the output signals have a differential relation to each other, and the linear driver includes a forward linear driver outputting a forward linear driving signal based on the forward differential current signal and a reverse linear driver outputting a reverse linear driving signal based on the reverse differential current signal.

According to an embodiment, the driving direction controller includes a direction controller outputting a forward enable signal and a reverse enable signal based on the digital signal output from the PID controller.

According to an embodiment, the driving direction controller further includes a forward on/off controller outputting a forward on/off control signal and a forward off signal based on the forward enable signal output from the direction controller; and a reverse on/off controller outputting a reverse on/off control signal and the reverse off signal based on the reverse enable signal output from the direction controller.

According to an embodiment, the driving direction controller further includes a first multiplexer selectively outputting a forward off signal output from the forward on/off controller or an output of the forward linear driver to the H-bridge circuit based on the forward enable signal output from the direction controller, and a second multiplexer selectively outputting a reverse off signal output from the reverse on/off controller or an output of the reverse linear driver to the H-bridge circuit based on the reverse enable signal output from the direction controller.

According to an embodiment, the PID controller outputs a digital signal of 10 bits, the direction controller outputs the forward enable signal and the reverse enable signal based on the most significant bit among the digital signals of 10 bits output from the PID controller, and the differential current digital-to-analog converter outputs the forward differential current signal and the reverse differential current signal of which the magnitudes have a differential relation to each other based on the digital signal of the remaining 9 bits other than the most significant bit among the digital signals of 10 bits output from the PID controller.

According to an embodiment, the H-bridge circuit includes one or more forward path transistors turned on or off depending on the output of the first multiplexer and the forward off signal of the forward on/off controller, and one or more reverse path transistors turned on or off depending on the output of the second multiplexer and the reverse off signal of the reverse on/off controller.

According to an embodiment, the one or more forward path transistors include a forward PMOS transistor having a drain connected to one end of the VCM, a gate applied with the output of the first multiplexer, and a source applied with a power supply voltage and linearly operated or turned off depending on the output of the first multiplexer applied to the gate, and a forward NMOS transistor having a drain connected to the other end of the VCM, a gate applied with the forward on/off control signal output from the forward on/off controller, and a source connected to a ground and turned on or off depending on the forward on/off control signal output from the forward on/off controller.

According to an embodiment, the one or more reverse path transistors includes a reverse PMOS transistor having a drain connected to the other end of the VCM, a gate applied with the output of the second multiplexer, and a source applied with the power supply voltage and linearly operated or turned off depending on the output of the second multiplexer applied to the gate, and a reverse NMOS transistor having a drain connected to one end of the VCM, a gate applied with the reverse on/off control signal output from the reverse on/off controller, and a source connected to a ground and turned on or off depending on the reverse on/off control signal output from the reverse on/off controller.

According to an embodiment, the forward linear driver includes a first operational amplifier including an inverting input terminal to which the forward differential current signal output from the differential current digital-to-analog converter is applied and a non-inverting input terminal, a first resistor connected between the inverting input terminal of the first operational amplifier and the ground, a first PMOS transistor having a gate connected to an output terminal of the first operational amplifier, a source applied with the power supply voltage, and a drain connected to a non-inverting input terminal of the first operational amplifier, and a second resistor having one end connected to the drain of the first PMOS transistor and the other end connected to a ground. According to an embodiment, the first operational amplifier outputs the forward driving signal, which is an output signal of the forward linear driver through the output terminal.

According to an embodiment, the reverse linear driver includes a second operational amplifier including an inverting input terminal to which the reverse current output signal output from the differential current digital-to-analog converter is applied and a non-inverting input terminal, a third resistor connected between the inverting input terminal of the second operational amplifier and the ground, a second PMOS transistor having a gate connected to an output terminal of the second operational amplifier, a source applied with the power supply voltage, and a drain connected to a non-inverting input terminal of the second operational amplifier, and a fourth resistor having one end connected to the drain of the second PMOS transistor and the other end connected to a ground. According to an embodiment, the second operational amplifier outputs the reverse driving signal which is an output signal of the reverse linear driver through the output terminal.

At the forward driving of the actuator, the first PMOS transistor of the forward linear driver and the forward PMOS transistor of the H-bridge circuit configures a current mirror circuit, and at the time of the reverse driving of the actuator, the second PMOS transistor of the reverse linear driver and the reverse PMOS transistor of the H-bridge circuit configures a current mirror circuit.

According to an embodiment, the magnitude of the forward driving current flowing in the actuator is proportional to a ratio of a resistance value of the first resistor to a resistance value of the second resistor and a ratio of a gate width of the forward PMOS transistor to a gate width of the first PMOS transistor, and the magnitude of the reverse driving current flowing in the actuator may is proportional to a ratio of a resistance value of the third resistor to a resistance value of the fourth resistor and a ratio of a gate width of the reverse PMOS transistor to a gate width of the second PMOS transistor.

According to an embodiment, the apparatus further includes a first offset controller removing an offset occurring in the forward linear driver, and a second offset controller removing an offset occurring in the reverse linear driver.

According to an embodiment, the mobile device includes one of a smart phone, a tablet PC, or a camera.

Various objects, advantages and features of the invention will become apparent from the following description of embodiments with reference to the accompanying drawings.

BRIEF DESCRIPTION OF DRAWINGS

These and other features, aspects, and advantages of the invention are better understood with regard to the following Detailed Description, appended Claims, and accompanying Figures. It is to be noted, however, that the Figures illustrate only various embodiments of the invention and are therefore not to be considered limiting of the invention's scope as it may include other effective embodiments as well.

DETAILED DESCRIPTION

Figure 1:
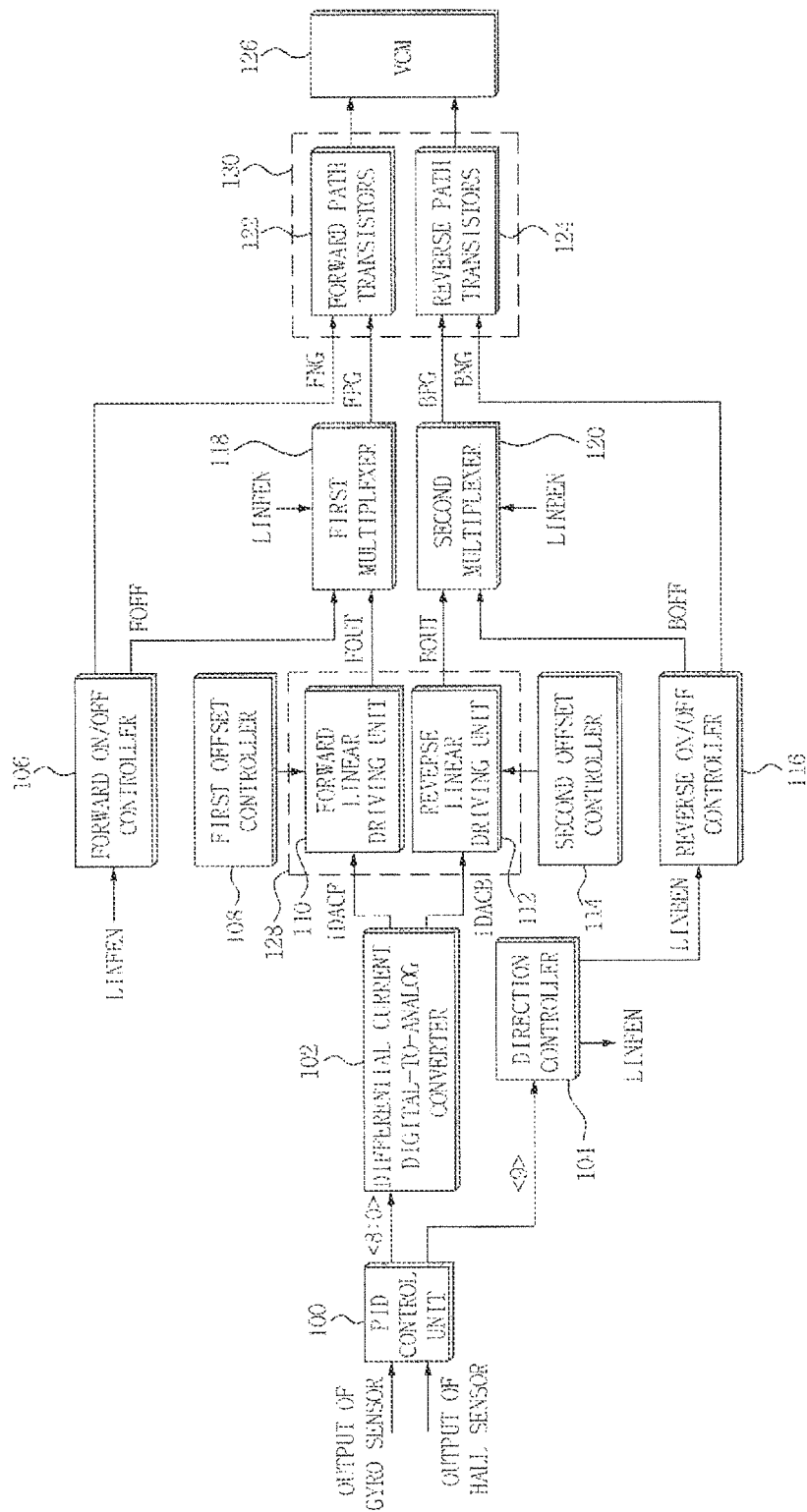
FIG. 1 is a block diagram illustrating an apparatus for driving an actuator of a camera module in a mobile device according to an embodiment of the invention.

Advantages and features of the present invention and methods of accomplishing the same will be apparent by referring to embodiments described below in detail in connection with the accompanying drawings. However, the present invention is not limited to the embodiments disclosed below and may be implemented in various different forms. The embodiments are provided only for completing the disclosure of the present invention and for fully representing the scope of the present invention to those skilled in the art.

For simplicity and clarity of illustration, the drawing figures illustrate the general manner of construction, and descriptions and details of well-known features and techniques may be omitted to avoid unnecessarily obscuring the discussion of the described embodiments of the invention. Additionally, elements in the drawing figures are not necessarily drawn to scale. For example, the dimensions of some of the elements in the figures may be exaggerated relative to other elements to help improve understanding of embodiments of the present invention. Like reference numerals refer to like elements throughout the specification.

Hereinafter, various embodiments of the present invention will be described in detail with reference to the accompanying drawings.

Figure 2:
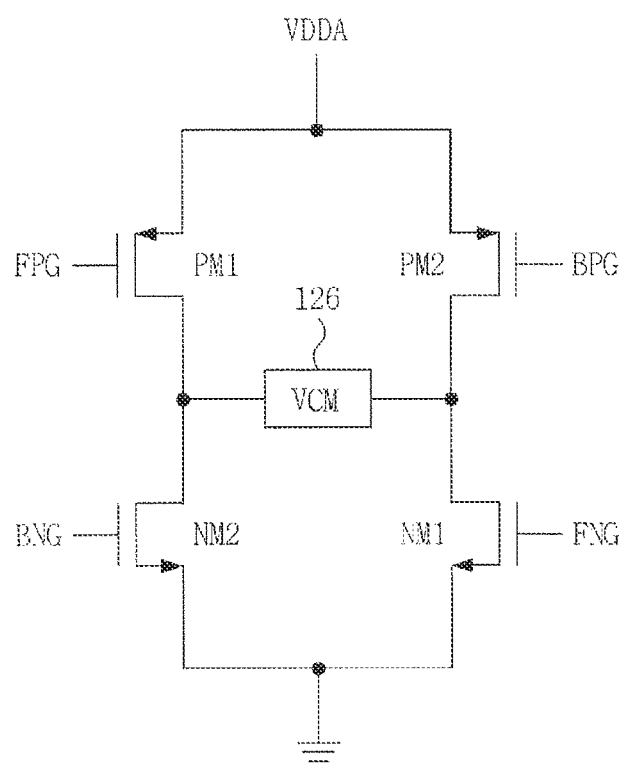
FIG. 2 is a detailed diagram of an H-bridge circuit illustrated in FIG. 1 according to an embodiment of the invention.
Figure 3:
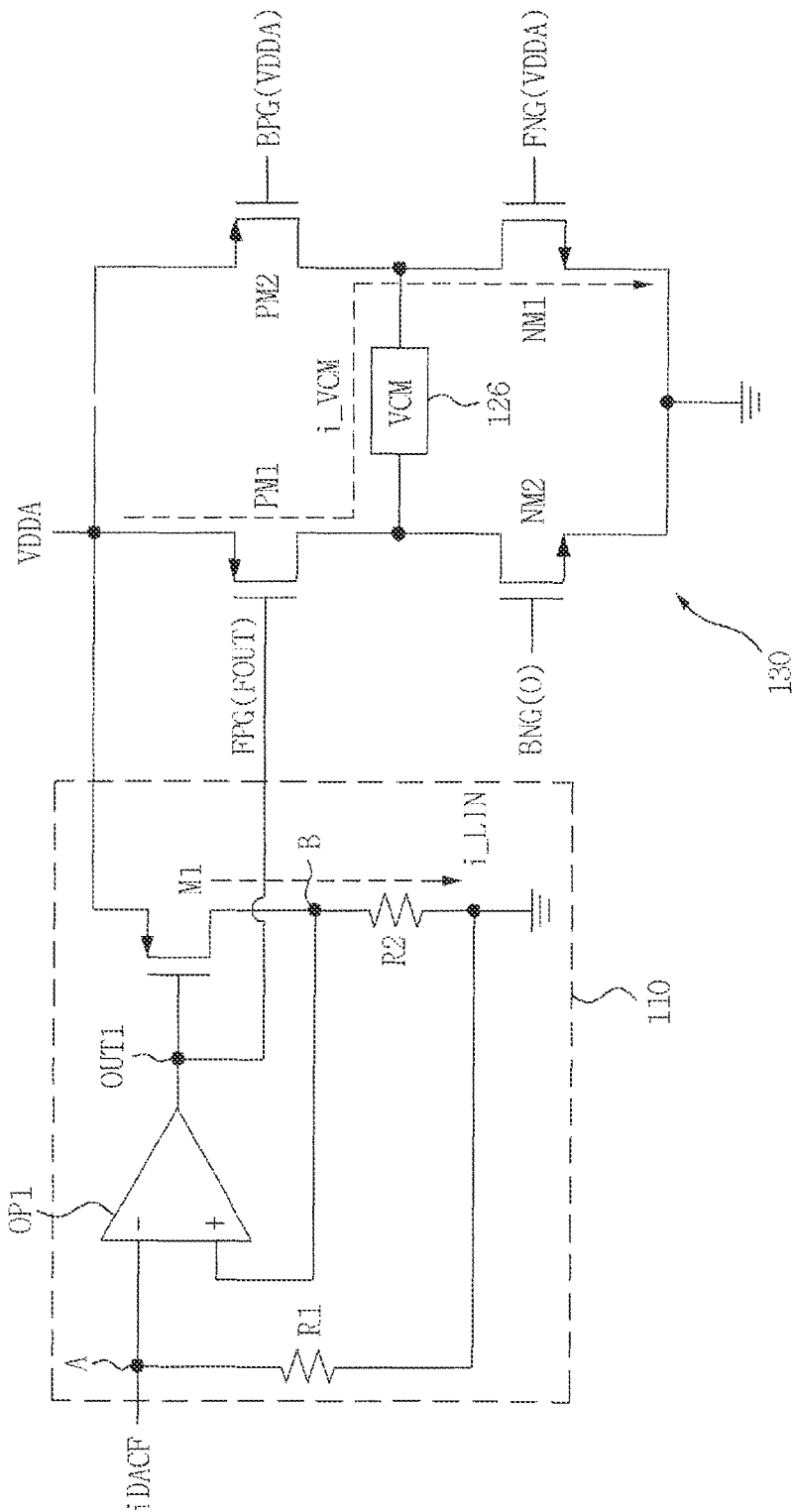
FIG. 3 is a diagram illustrating a configuration of a forward linear driver and an H-bridge circuit at the time of a forward driving of a VCM according to an embodiment of the invention.
Figure 4:
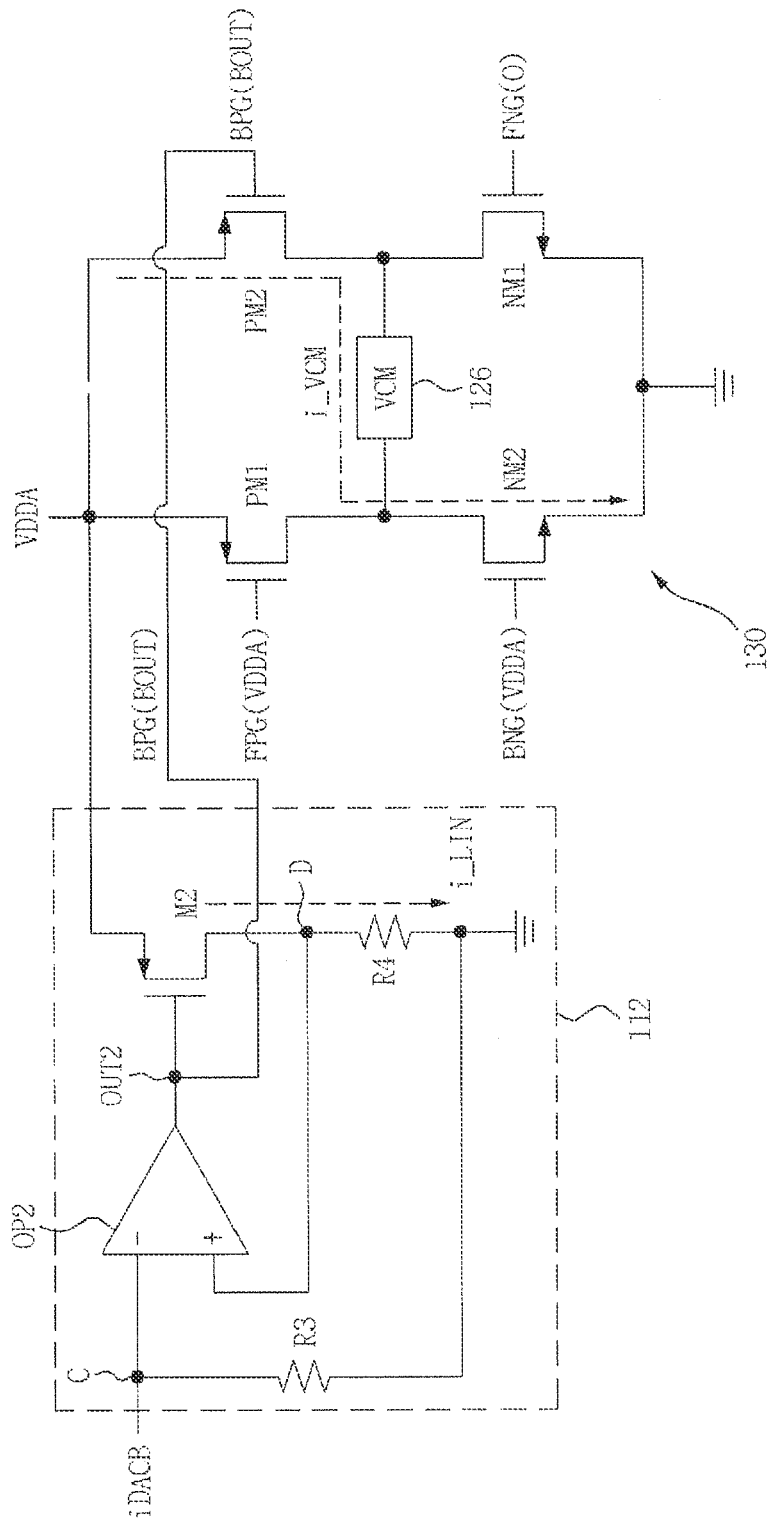
FIG. 4 is a diagram illustrating a configuration of a reverse linear driver and the H-bridge circuit at the time of a reverse driving of the VCM according to an embodiment of the invention.
Figure 5:
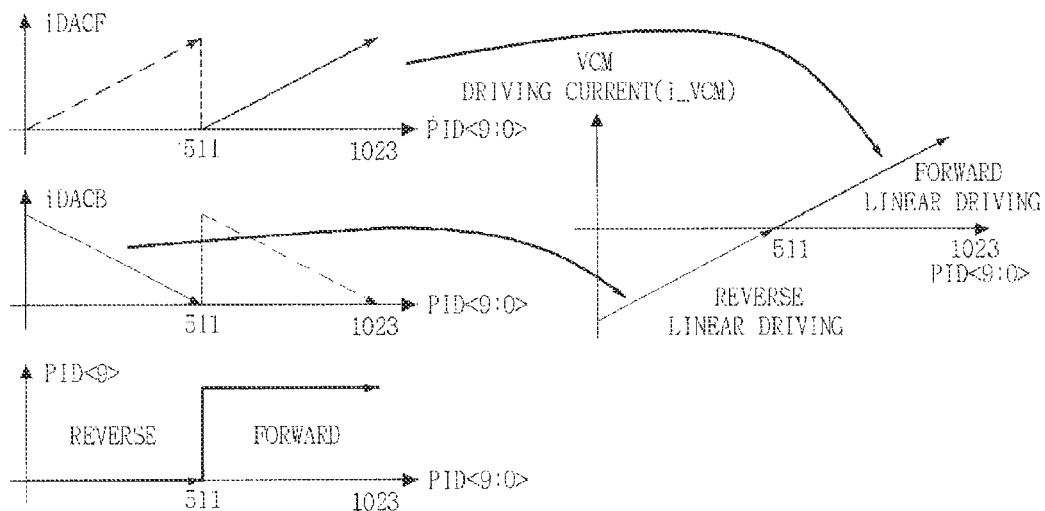
FIG. 5 is a graph illustrating a forward and reverse current driving of the VCM using a differential current digital to analog converter according to an embodiment of the invention.

FIG. 1 is a block diagram illustrating an apparatus for driving an actuator of a camera module in a mobile device according to an embodiment of the invention, FIG. 2 is a detailed diagram of an H-bridge circuit illustrated in FIG. 1 according to an embodiment of the invention, FIG. 3 is a diagram illustrating a configuration of a forward linear driver and an H-bridge circuit at the time of a forward driving of a VCM according to an embodiment of the invention, FIG. 4 is a diagram illustrating a configuration of a reverse linear driver and the fl-bridge circuit at the time of a reverse driving of the VCM according to an embodiment of the invention, and FIG. 5 is a graph illustrating a forward and reverse current driving of the VCM using a differential current digital to analog converter according to an embodiment of the invention.

Hereinafter, an apparatus for driving an actuator of a camera module in a mobile device according to various embodiments of the invention will be described with reference to FIGS. 1 to 5. The apparatus for driving an actuator of a camera module in a mobile device according to an embodiment of the invention includes, for example, a VCM controlling a position of a lens module as an actuator and linearly drives the VCM forward or reversely.

As illustrated in FIG. 1, the apparatus for driving an actuator of a camera module in a mobile device according to an embodiment of the invention includes a proportional-integral-derivative (hereinafter, referred to as PID) controller 100, which compares an output of a gyro sensor (not illustrated) with an output of a hall sensor (not illustrated) sensing a position of a VCM 126 to output a digital signal of 10 bits, a differential current digital-to-analog converter 102, which converts a digital signal <8:0> of 9 bits among the digital signal of 10 bits output from the PID controller 100 into an analog differential current signal, a linear driver 128 which receives a forward differential current signal and a reverse differential current signal output from the differential current digital-to-analog converter 102 to output a linear driving signal, an H-bridge circuit 130, which controls a magnitude of forward driving current and a reverse driving current flowing in the VCM 126 based on the output of the linear driver 128, and driving direction controllers 104, 106, 116, 118, and 120, which output a signal controlling a direction of the driving current flowing in the VCM 126 to the H-bridge circuit 130 based on a logic state of the most significant bit <9> among the digital signals output from the PID controller 100.

According to an embodiment, the differential current digital to analog converter 102 outputs a forward differential current signal iDACF and a reverse differential current signal iDACB of which magnitudes of the output signals have a differential relation to each other, and the linear driver 128 includes a forward linear driver 110, which outputs a forward linear driving signal FOUT based on the forward differential current signal iDACF and a reverse linear driver 112, which outputs a linear reverse driving signal BOUT based on a reverse differential current signal iDACB.

According to an embodiment, the driving direction controllers 104, 106, 116, 118, and 120 include a direction controller 104, which outputs a forward enable signal LINFEN and a reverse enable signal LINBEN based on the most significant bit <9> among the digital signals output from the PID controller 100, a forward on/off controller 106, which outputs a forward on/off control signal FNG and a forward off signal FOFF based on the forward enable signal LINFEN output from the direction controller 104, a reverse on/off controller 116, which outputs a reverse on/off control signal BNG and a reverse off signal BOFF based on the reverse enable signal LINBEN output from the direction controller 104, a first multiplexer 118, which selectively outputs a forward off signal FOFF output from the forward on/off controller 106 or a forward driving signal FOUT output from the forward linear driver 110 to one or more forward path transistors 122 within the H-bridge circuit 130 based on the forward enable signal LINFEN output from the direction controller 104, and a second multiplexer 120, which selectively outputs a reverse off signal BOFF output from the reverse on/off controller 116 or a reverse driving signal BOUT output from the reverse linear driver 112 to one or more reverse path transistors 124 within the H-bridge circuit 130 based on the reverse enable signal LINBEN output from the direction controller 104.

According to an embodiment, the differential current digital-to-analog converter 102 outputs the forward differential current signal iDACF and the reverse differential current signal iDACB of which the magnitudes of the output signals have a differential relation to each other based on the digital signal of 9 bits other than the most significant bit <9> among the digital signals of 10 bits output from the PID controller 100.

Referring to FIGS. 1 and 2, the H-bridge circuit 130 includes one or more forward path transistors 122, which are turned on or off depending on an output of the first multiplexer 118 and the forward off signal FOFF of the forward on/off controller 106 and one or more reverse path transistors 124, which are turned on or off depending on an output of the second multiplexer 120 and the reverse off signal BOFF of the reverse on/off controller 116.

According to an embodiment, the one or more forward path transistors 122 include a forward PMOS transistor PM1 having a drain connected to one end of the VCM 126, a gate applied with the output FPG of the first multiplexer 118, and a source applied with a power supply voltage VDDA and linearly operated or turned off depending on the output FPG of the first multiplexer 118 applied to the gate and a forward NMOS transistor NM1 having a drain connected to the other end of the VCM 126, a gate applied with a forward on/off control signal FNG output from the forward on/off controller 106, and a source connected to a ground and turned on or off depending on the forward on/off control signal FNG output from the forward on/off controller 106.

Further, the one or more reverse path transistors 124 include a reverse PMOS transistor PM2 having a drain connected to the other end of the VCM 126, a gate applied with the output BPG of the second multiplexer 120, and a source applied with the power supply voltage VDDA and linearly operated or turned off depending on the output BPG of the second multiplexer 120 applied to the gate and a reverse NMOS transistor NM2 having a drain connected to one end of the VCM 126, a gate applied with the reverse on/off control signal BNG output from the reverse on/off controller 116, and a source connected to a ground and turned on or off depending on the reverse on/off control signal BNG output from the reverse on/off controller 116.

Referring to FIGS. 1 and 3, the forward linear driver 110 includes a first operational amplifier OP1 which includes an inverting input terminal applied with the forward differential current signal iDACF output from the differential current digital to analog converter 102 and a non-inverting input terminal, a first resistor R1 connected between the inverting input terminal of the first operational amplifier OP1 and a ground, a first PMOS transistor M1 having a gate connected to an output terminal OUT1 of the first operational amplifier OP1, a source applied with the power supply voltage VDDA, and a drain connected to the non-inverting input terminal of the first operational amplifier OP1, and a second resistor R2 having one end connected to the drain of the first PMOS transistor M1 and the other end connected to a ground, in which the first operational amplifier OP1 outputs the forward driving signal FOUT which is an output signal of the forward linear driver 110 through the output terminal OUT1.

Referring to FIGS. 1 and 4, the reverse linear driver 112 includes a second operational amplifier OP2, which includes an inverting input terminal applied with the reverse current output signal iDACB output from the differential current digital to analog converter 102 and a non-inverting input terminal, a third resistor R3 connected between the inverting input terminal of the second operational amplifier OP2 and a ground, a second PMOS transistor M2 having a gate connected to an output terminal OUT2 of the second operational amplifier OP2, a source applied with the power supply voltage VDDA, and a drain connected to the non-inverting input terminal of the second operational amplifier OP2, and a fourth resistor R4 having one end connected to the drain of the second PMOS transistor M2 and the other end connected to a ground, in which the second operational amplifier OP2 outputs the reverse driving signal BOUT, which is an output signal of the reverse linear driver 112 through the output terminal OUT2.

According to an embodiment, the apparatus for driving an actuator of a camera module in a mobile device according to an embodiment of the invention further includes a first offset controller 108, which removes an offset occurring in the forward linear driver 110 and a second offset controller 114, which removes an offset occurring in the reverse linear driver 112.

According to an embodiment, an operation of the apparatus for driving an actuator of a camera module in a mobile device according to an embodiment of the invention configured as described above will be described below.

According to an embodiment, the PID controller 10 outputs, for example, the digital signal of 10 bits and compares the output of the gyro sensor (not illustrated) sensing the external position with the output of the hall sensor (not illustrated) sensing the position of the VCM 126 to output the control signal of 10 bits so as to reduce the error value.

According to an embodiment, the direction controller 104 generates and outputs the forward enable signal LINFEN, which is the forward control signal and the reverse enable signal LINBEN, which is the reverse control signal based on a logic state of the most significant bit <9> among the digital outputs of 10 bits output from the PID controller 100.

According to an embodiment, the differential current digital to analog converter 102 converts the signal of 9 bits <8:0> among the digital outputs of 10 bits output from the PID controller 100 into a current value to output the forward differential current signal iDACF and the reverse differential current signal iDACB. The two differential current signals iDACF and iDACB output from the differential current digital-to-analog converter 102 have a differential relation to each other in which when one of the two differential current signals iDACF and iDACB is a maximum value, the other signal is a minimum value and when one of the two differential current signals iDACF and iDACB is a minimum value, the other signal is a maximum value.

According to an embodiment, the apparatus for driving an actuator of a camera module in a mobile device according to an embodiment of the invention directly converts the digital output signal of 10 bits output from the PID controller 100 into two differential currents using the differential current digital-to-analog converter 102 and amplifies the currents using a linear driver 128 and an H-bridge circuit 130, thereby linearly forward or reversely driving the VCM 126 more accurately without any deviation than the driving apparatus using the typical digital-to-analog converter outputting an analog voltage.

According to an embodiment, the linear driver 128 generates and outputs the forward driving signal FOUT and the reverse driving signal BOUT each applied to the gates of the large PMOS transistors PM1 and PM2, which control the forward and reverse currents and are included in the H-bridge circuit 130 of the VCM 126 based on the forward differential current signal iDACF and the reverse differential current signal iDACB output from the differential current digital-to-analog converter 102.

According to an embodiment, the forward linear driver 110 generates and outputs the forward driving signal FOUT applied to the gate of the first PMOS transistor PM1, which controls the forward currents and is included in the H-bridge circuit 130 of the VCM 126 based on the forward differential current signal iDACF output from the differential current digital-to-analog converter 102.

According to an embodiment, the reverse linear driver 112 generates and outputs the reverse driving signal BOUT applied to the gate of the second PMOS transistor PM2, which controls the reverse currents and is included in the H-bridge circuit 130 of the VCM 126 based on the reverse differential current signal iDACB output from the differential current digital-to-analog converter 102.

According to an embodiment, the first offset controller 108 removes an offset occurring in the forward linear driver 110 and the second offset controller 114 removes the offset occurring in the reverse linear driver 112.

According to an embodiment, the forward on/off controller 106 outputs the forward on/off control signal FNG and the forward off signal FOFF based on the forward enable signal LINFEN output from the direction controller 104.

According to an embodiment, the reverse on/off controller 116 outputs the reverse on/off control signal BNG and the reverse off signal BOFF based on the reverse enable signal LINBEN output from the direction controller 104.

According to an embodiment, the forward on/off controller 106 controls the turn on/off of the one or more forward path transistors 122 (PM1 and NM1) included in the H-bridge circuit 130 and the reverse on/off controller 116 controls the turn on/off of the one or more reverse path transistors 124 (PM2 and NM2) included in the H-bridge circuit 130 to control the current driving direction of the VCM 126.

According to an embodiment, the first multiplexer 118 selects one of the forward driving signal FOUT output from the forward linear driver 110 and the forward off signal FOFF output from the forward on/off controller 106 based on the forward enable signal LINFEN output from the direction controller 104 and applies the selected signal to the gate of the forward PMOS transistor PM1 of the one or more forward path transistors 122 (PM1 and NM1) included in the H-bridge circuit 130.

According to an embodiment, the second multiplexer 120 selects one of the reverse driving signal BOUT output from the reverse linear driver 112 and the reverse off signal BOFF output from the reverse on/off controller 116 based on the reverse enable signal LINBEN output from the direction controller 104 and applies the selected signal to the gate of the reverse PMOS transistor PM2 of the one or more reverse path transistors 124 (PM2 and NM2) included in the H-bridge circuit 130.

Table 1 shows an operation state of the apparatus for driving an actuator of a camera module in a mobile device according to the preferred embodiment of the present invention depending on the most significant bit PID<9> among the digital signals of 10 bits output from the PID controller 100.

Meanwhile, the power supply voltage VDDA is applied to the gate of the reverse PMOS transistor PM2 of the H-bridge circuit 130 and 0 is applied to the gate of the reverse NMOS transistor NM2, such that the reverse PMOS transistor PM2 and the reverse NMOS transistor NM2 are turned off.

Therefore, the H-bridge circuit 130 makes a current linearly flow in the voice coil 126 forward as shown by an arrow, such that the VCM 126 is forward driven linearly.

At the time of the forward driving mode, since the forward PMOS transistor PM1 is driven by the forward linear driver 110, the VCM 126 may be linearly current-driven forward depending on the digital signal of 9 bits among the digital signals of 10 bits output from the PID controller 100.

In the case of the reverse driving mode, the most significant bit PID<9> among the digital outputs of 10 bits output from the PID controller 100 becomes 0 and the reverse enable signal LINBEN output from the direction controller

TABLE 1

| PID<9> | Linear mode | Output of direction controller | | H-bridge circuit: Signals applied to gates of one or more forward path transistors PM1 and NM1 | | H-bridge circuit: Signals applied to gates of one or more reverse path transistors PM2 and NM2 | |
|---|---|---|---|---|---|---|---|
| | | LINFEN | LINBEN | FPG(PM1) | FNG(NM1) | BPG(PM2) | BNG(NM2) |
| 1 | Forward driving mode | H | L | FOUT(Linear) | VDDA | VDDA | 0 |
| 0 | Reverse driving mode | L | H | VDDA | 0 | BOUT (Linear) | VDDA |

In the case of the forward driving mode, the most significant bit PID<9> among the digital outputs of 10 bits output from the PID controller 100 becomes 1 and the forward enable signal LINFEN output from the direction controller 104 becomes "H" which is in a logic high state and the reverse enable signal LINBEN becomes "L" which is in a logic low state.

Since the forward enable signal LINFEN becomes "H", the first multiplexer 118 selects the forward driving signal FOUT output from the forward linear driver 110 to output the output signal FPG. At the time of the forward driving mode, the forward on/off control signal FNG output from the forward on/off controller 106 becomes the power supply voltage VDDA.

Since the reverse enable signal LINBEN becomes "L", the second multiplexer 120 selects the reverse off signal BOFF output from the reverse on/off controller 116 to output the output signal BPG. At the time of the forward driving mode, the reverse off signal BOFF output from the reverse on/off controller 116 becomes the power supply voltage VDDA and the reverse on/off control signal BNG becomes 0.

Referring to FIGS. 1 and 3, in the case of the forward driving mode, the forward linear driving signal FOUT output from the forward linear driver 110 is applied to the gate of the forward PMOS transistor PM1 of the H-bridge circuit 130 and thus the forward PMOS transistor PM1 is linearly driven and the power supply voltage VDDA is applied to the gate of the forward NMOS transistor NM1 of the H-bridge circuit 130 and thus the forward NMOS transistor NM1 is turned on.

104 becomes "H", which is in a logic high state and the forward enable signal LINFEN becomes "L", which is in a logic low state.

Since the reverse enable signal LINBEN becomes "H", the second multiplexer 120 selects the reverse driving signal BOUT output from the reverse linear driver 112 to output the output signal BPG. At the time of the reverse driving mode, the reverse on/off control signal BNG output from the reverse on/off controller 116 becomes the power supply voltage VDDA.

Since the forward enable signal LINFEN becomes "L", the first multiplexer 118 selects the forward off signal FOFF output from the forward on/off controller 106 to output the output signal FPG. At the time of the reverse driving mode, the forward off signal FOFF output from the forward on/off controller 106 becomes the power supply voltage VDDA and the forward on/off control signal FNG becomes 0.

Referring to FIGS. 1 and 4, in the case of the reverse driving mode, the linear reverse driving signal BOUT output from the reverse linear driver 112 is applied to the gate of the reverse PMOS transistor PM2 of the H-bridge circuit 130 and thus the reverse PMOS transistor PM2 is linearly driven and the power supply voltage VDDA is applied to the gate of the reverse NMOS transistor NM2 of the H-bridge circuit 130 and thus the reverse NMOS transistor NM2 is turned on.

Meanwhile, the power supply voltage VDDA is applied to the gate of the forward PMOS transistor PM1 of the H-bridge circuit 130 and 0 is applied to the gate of the forward NMOS transistor NM1, such that the forward PMOS transistor PM1 and the forward NMOS transistor NM1 are turned off.

Therefore, the H-bridge circuit 130 makes a current flow in the VCM 126 reversely as shown by an arrow, such that the VCM 126 is reversely driven linearly.

At the time of the reverse driving mode, since the reverse PMOS transistor PM2 is driven by the reverse linear driver 112, the VCM 126 may be linearly current-driven reversely depending on the digital signal of 9 bits among the digital signals of 10 bits output from the PID controller 100.

Further, in the apparatus for driving an actuator of a camera module in a mobile device according to an embodiment of the invention, the output signal of 9 bits among the digital signals of 10 bits output from the PID controller 100 is converted into the forward differential current signal iDACF and the reverse differential current signal iDACB, respectively, by the differential current analog-to-digital converter 102 as illustrated in FIG. 5.

As illustrated in FIG. 5, the two differential current signals iDACF and iDACB output from the differential current digital-to-analog converter 102 have the differential relation to each other in which when one of the two differential current signals iDACF and iDACB is a maximum value, the other signal is a minimum value and when one of the two differential current signals iDACF and iDACB is a minimum value, the other signal is a maximum value.

Therefore, the forward and reverse driving mode is selected depending on the most significant bit PID<9> among the digital signals of 10 bits output from the PID controller 100 based on the operation state as shown in Table 1, such that the H-bridge circuit 130 outputs a VCM driving current i_VCM having a range of 10 bits as illustrated in the right of FIG. 5.

Meanwhile, in the apparatus for driving an actuator of a camera module in a mobile device according to an embodiment of the invention, the linear operation of the VCM 126 will be described in detail.

Referring to FIG. 3, the first PMOS transistor M1 included in the forward linear driver 112 and the forward PMOS transistor PM1 included in the H-bridge circuit 130 configure a current mirror circuit.

Therefore, the VCM driving current i_VCM flowing in the VCM 126 depending on the characteristics of the current mirror circuit may be represented by the following Equation 1.

$$i\_VCM = i\_LIN \times (\text{Gate Width of PM1/Gate Width of } M1) \quad \text{[Equation 1]}$$

In the above Equation 1, i_LIN represents the current flowing in the second resistor R2 and in view of the characteristics of the operational amplifier, a voltage VB applied to a node B is equal to a voltage VA applied to a node A and therefore the i_LIN may be represented by the following Equation 2.

$$i\_LIN = \frac{V_B}{R2} = \frac{V_A}{R2} = \frac{(R1 \times iDACF)}{R2} \quad \text{[Equation 2]}$$

In the above Equation 2, R1 represents a resistance value of a first resistor R1 and R2 represents a resistance value of a second resistor R2. Therefore, the VCM driving current i_VCM may be represented by the following Equation 3.

$$i\_VCM = (R1/R2) \times (\text{Gate Width of PM1/Gate Width of } M1) \times iDACF \quad \text{[Equation 3]}$$

As represented by the following Equation 3, the VCM driving current i_VCM has a linear characteristic with respect to the forward differential current signal iDACF output from the differential current digital-to-analog converter 102.

In particular, the VCM driving current i_VCM is in proportion to a ratio of the resistance value of the first resistance R1 to the resistance value of the second resistor R2 and a ratio of the gate width of the forward PMOS transistor PM1 to the gate width of the first PMOS transistor M1.

Therefore, a resistor having a resistance value of several hundred ohms to several kilo ohms which is less affected by a temperature change and a process deviation with respect to the output current of the differential current digital-to-analog converter 102 may be used as the first resistor R1 or the second resistor R2 of the forward linear driver 110 and may be used as a third resistor R3 or a fourth resistor R4 of the reverse linear driver 112.

Further, the transistors PM1 and PM2 which are less affected by the temperature change and the process deviation with respect to the output current of the differential current digital-to-analog converter 102 may be used as the forward PMOS transistor PM1 or the reverse PMOS transistor PM2 of the H-bridge circuit 130.

As described above, the current driving of the linear VCM 126 may be made by the ratio of the resistance values of the resistors having several hundred ohms to several kilo ohms which are less affected by the temperature change and the process deviation with respect to the output current of the differential current digital-to-analog converter 102 and the ratio of the gate widths of the transistors.

Figure 6A:
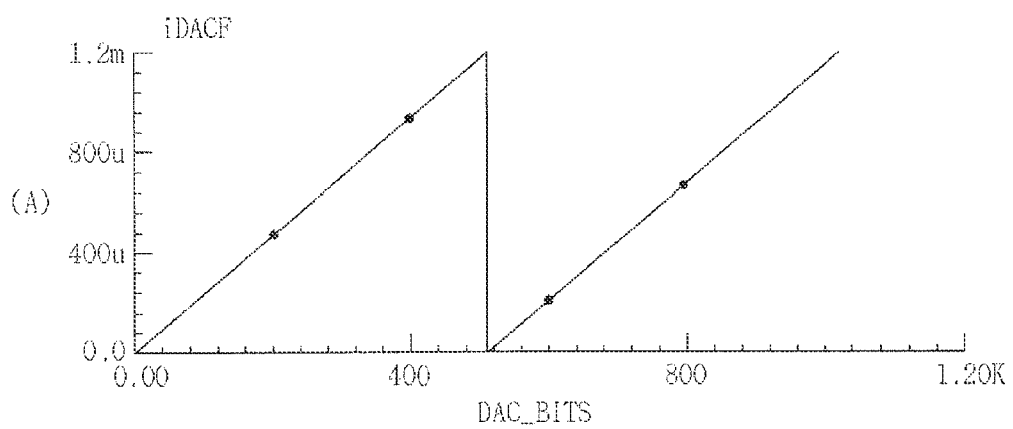
FIG. 6A to 6C are graphs illustrating a simulation result of the apparatus for driving an actuator of a camera module in a mobile device according to an embodiment of the invention.
Figure 6B:
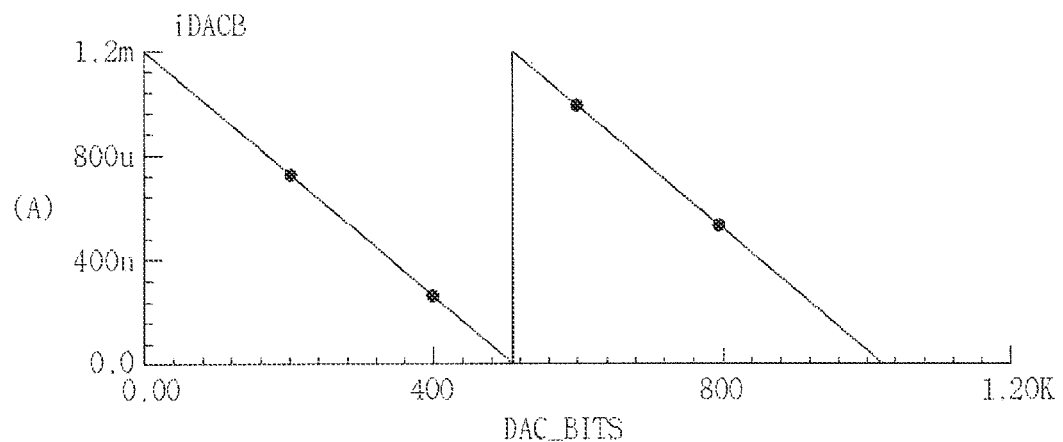
Figure 6C:
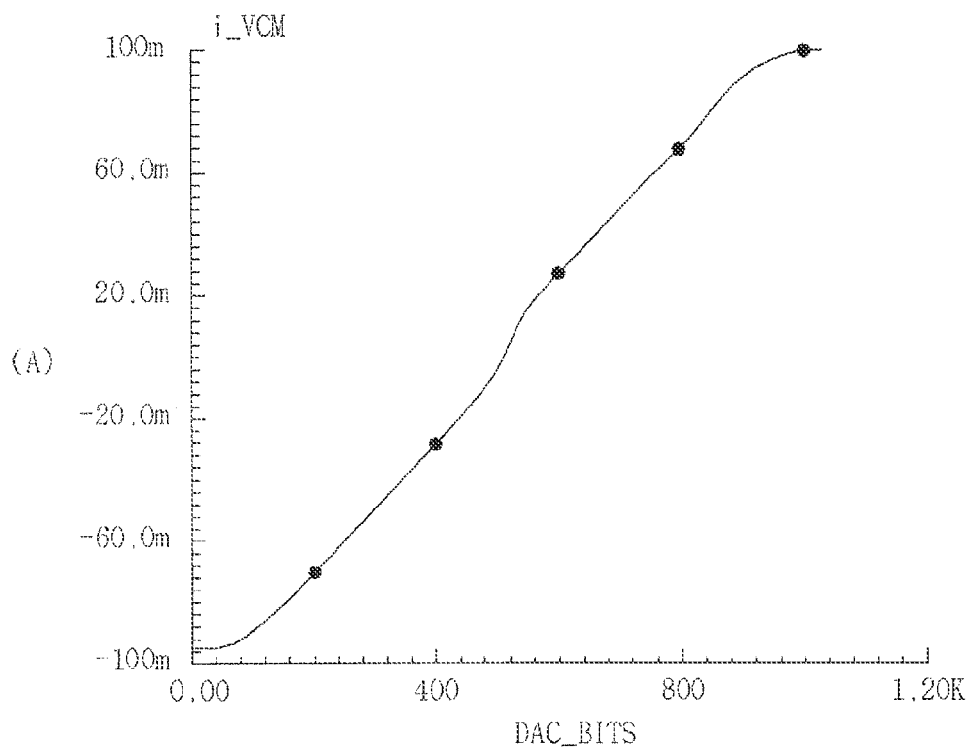

FIG. 6A to 6C are graphs illustrating a simulation result of the apparatus for driving an actuator of a camera module in a mobile device according to an embodiment of the invention.

FIG. 6A illustrates the forward differential current signal iDACF of the differential current digital-to-analog converter 102 with respect to an output DAC_BITS of the PID controller 100, FIG. 6B illustrates the reverse differential current signal iDACB with respect to the output DAC_BITS of the PID controller 100, and the FIG. 6C illustrates the driving current i_VCM of the linear VCM.

It may be appreciated from the simulation result that the forward and reverse linear VCM driving currents are output depending on the digital output of 10 bits of the PID controller 100.

The apparatus for driving an actuator of a camera module in a mobile device according to an embodiment of the invention directly converts the digital output signal of plural bits output from the PID controller 100 into two differential currents using the differential current digital-to-analog converter 102 and amplifies the currents using the forward linear driver 110, the reverse linear driver 112, and an H-bridge circuit 130, thereby linearly forward or reversely driving the VCM 126 more accurately without any deviation than the driving apparatus using the typical digital-to-analog converter outputting an analog voltage.

Further, the apparatus for driving an actuator of a camera module in a mobile device according to an embodiment of the invention uses the output of the PID controller 100 of plural bits to provide the current driving of the linear VCM, thereby more accurately and rapidly controlling the position of the VCM.

Further, the apparatus for driving an actuator of a camera module in a mobile device according to an embodiment of the invention uses the differential current digital-to-analog converter 102 using the digital signal of 9 bits as an input and the direction controller 104 using the digital signal of 1 bit as an input to linearly drive the VCM 126 within the current control range of 10 bits forward or reversely.

According to the various embodiments of the invention, it is possible to more accurately and rapidly control the position of the actuator by linearly controlling the forward and reverse current of the actuator using the differential current digital-to-analog converter and the linear driver, and it is also possible to provide the linear current driving of the actuator based on the ratio of resistance values of several hundred ohms to several kilo ohms and the ratio of gate widths of transistors which are less affected by the temperature change and the process deviation with respect to the output current of the differential current digital-to-analog converter.

Terms used herein are provided to explain embodiments, not limiting the present invention. Throughout this specification, the singular form includes the plural form unless the context clearly indicates otherwise. When terms "comprises" and/or "comprising" used herein do not preclude existence and addition of another component, step, operation and/or device, in addition to the above-mentioned component, step, operation and/or device.

Embodiments of the present invention may suitably comprise, consist or consist essentially of the elements disclosed and may be practiced in the absence of an element not disclosed. For example, it can be recognized by those skilled in the art that certain steps can be combined into a single step.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe the best method he or she knows for carrying out the invention.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments of the invention described herein are, for example, capable of operation in sequences other than those illustrated or otherwise described herein. Similarly, if a method is described herein as comprising a series of steps, the order of such steps as presented herein is not necessarily the only order in which such steps may be performed, and certain of the stated steps may possibly be omitted and/or certain other steps not described herein may possibly be added to the method.

The singular forms "a," "an," and "the" include plural referents, unless the context clearly dictates otherwise.

As used herein and in the appended claims, the words "comprise," "has," and "include" and all grammatical variations thereof are each intended to have an open, non-limiting meaning that does not exclude additional elements or steps.

As used herein, the terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the invention described herein are, for example, capable of operation in other orientations than those illustrated or otherwise described herein. The term "coupled," as used herein, is defined as directly or indirectly connected in an electrical or non-electrical manner. Objects described herein as being "adjacent to" each other may be in physical contact with each other, in close proximity to each other, or in the same general region or area as each other, as appropriate for the context in which the phrase is used. Occurrences of the phrase "according to an embodiment" herein do not necessarily all refer to the same embodiment.

Ranges may be expressed herein as from about one particular value, and/or to about another particular value. When such a range is expressed, it is to be understood that another embodiment is from the one particular value and/or to the other particular value, along with all combinations within said range.

Although the present invention has been described in detail, it should be understood that various changes, substitutions, and alterations can be made hereupon without departing from the principle and scope of the invention. Accordingly, the scope of the present invention should be determined by the following claims and their appropriate legal equivalents.

What is claimed is:

1. An apparatus for driving an actuator of a camera module in a mobile device, the apparatus comprising:

a proportional-integral-derivative (PID) controller configured to compare an output of a gyro sensor with an output of a hall sensor configured to sense a position of an actuator, and to output a digital signal;

a differential current digital-to-analog converter configured to convert the digital signal output from the PID controller into an analog current signal;

a linear driver configured to amplify the signal output from the differential current digital-to-analog converter, and to output a linear driving signal;

an H-bridge circuit configured to apply a forward driving current, or a reverse driving current having a linear characteristic with respect to the output of the differential current digital-to-analog converter, to the actuator; and a driving direction controller configured selectively output the linear driving signal to the H-bridge circuit, based on the digital signal output from the PID controller, thereby controlling a direction of current flowing in the actuator to the H-bridge circuit.

2. The apparatus as set forth in claim 1, wherein the actuator comprises a voice coil motor (VCM).

3. The apparatus as set forth in claim 2, wherein the differential current digital-to-analog converter is further configured to output a forward differential current signal and a reverse differential current signal, of which the magnitudes of the output signals have a differential relation to each other, and wherein the linear driver comprises a forward linear driver configured to output a forward linear driving signal based on the forward differential current signal, and a reverse linear driver configured to output a reverse linear driving signal based on the reverse differential current signal.

4. The apparatus as set forth in claim 3, wherein the driving direction controller comprises a direction controller configured to output a forward enable signal and a reverse enable signal, based on the digital signal output from the PID controller.

5. The apparatus as set forth in claim 4, wherein the driving direction controller further comprises:
a forward on/off controller configured to output a forward on/off control signal and a forward off signal, based on the forward enable signal output from the direction controller; and
a reverse on/off controller configured to output a reverse on/off control signal and a reverse off signal, based on the reverse enable signal output from the direction controller.

6. The apparatus as set forth in claim 5, wherein the driving direction controller further comprises:
a first multiplexer configured to selectively output a forward off signal output from the forward on/off controller, or an output of the forward linear driver to the H-bridge circuit, based on the forward enable signal output from the direction controller; and
a second multiplexer configured to selectively output a reverse off signal output from the reverse on/off controller, or an output of the reverse linear driver to the H-bridge circuit, based on the reverse enable signal output from the direction controller.

7. The apparatus as set forth in claim 4,
wherein the PID controller is further configured to output a digital signal of 10 bits,
wherein the direction controller is further configured to output the forward enable signal and the reverse enable signal, based on the most significant bit among the digital signals of 10 bits output from the PID controller, and
wherein the differential current digital-to-analog converter is further configured to output the forward differential current signal and the reverse differential current signal, of which the magnitudes have a differential relation to each other, based on the digital signal of the remaining 9 bits other than the most significant bit among the digital signals of 10 bits output from the PID controller.

8. The apparatus as set forth in claim 6, wherein the H-bridge circuit comprises:
one or more forward path transistors turned on or off, depending on the output of the first multiplexer and the forward off signal of the forward on/off controller; and
one or more reverse path transistors turned on or off, depending on the output of the second multiplexer and the reverse off signal of the reverse on/off controller.

9. The apparatus as set forth in claim 8, wherein the one or more forward path transistors comprise:
a forward PMOS transistor comprising
a drain connected to one end of the VCM,
a gate applied with the output of the first multiplexer, and
a source applied with a power supply voltage, and linearly operated or turned off depending on the output of the first multiplexer applied to the gate; and
a forward NMOS transistor comprising
a drain connected to the other end of the voice coil motor,
a gate applied with the forward on/off control signal output from the forward on/off controller, and
a source connected to a ground, and turned on or off depending on the forward on/off control signal output from the forward on/off controller.

10. The apparatus as set forth in claim 9, wherein the one or more reverse path transistors comprise:
a reverse PMOS transistor comprising
a drain connected to the other end of the voice coil motor,
a gate applied with the output of the second multiplexer, and
a source applied with the power supply voltage, and linearly operated or turned off depending on the output of the second multiplexer applied to the gate; and
a reverse NMOS transistor comprising
a drain connected to one end of the VCM,
a gate applied with the reverse on/off control signal output from the reverse on/off controller, and
a source connected to a ground, and turned on or off depending on the reverse on/off control signal output from the reverse on/off controller.

11. The apparatus as set forth in claim 3, wherein the forward linear driver comprises:
a first operational amplifier comprising
an inverting input terminal to which the forward differential current signal output from the differential current digital-to-analog converter is applied, and
a non-inverting input terminal;
a first resistor connected between
the inverting input terminal of the first operational amplifier, and
the ground;
a first PMOS transistor comprising
a gate connected to an output terminal of the first operational amplifier,
a source applied with the power supply voltage, and
a drain connected to a non-inverting input terminal of the first operational amplifier; and
a second resistor connected between
the drain of the first PMOS transistor, and
ground, and
wherein the first operational amplifier is configured to output the forward driving signal, wherein the forward driving signal is an output signal of the forward linear driver through the output terminal.

12. The apparatus as set forth in claim 11, wherein the reverse linear driver comprises:
a second operational amplifier comprising
an inverting input terminal to which the reverse current output signal output from the differential current digital-to-analog converter is applied, and
a non-inverting input terminal;
a third resistor connected between
the inverting input terminal of the second operational amplifier, and
the ground;
a second PMOS transistor comprising
a gate connected to an output terminal of the second operational amplifier,
a source applied with the power supply voltage, and
a drain connected to a non-inverting input terminal of the second
operational amplifier; and
a fourth resistor connected between
the drain of the second PMOS transistor, and
ground, and
wherein the second operational amplifier is configured to output the reverse driving signal, wherein the forward driving signal an output signal of the reverse linear driver through the output terminal.

13. The apparatus as set forth in claim 12,
wherein during the forward driving of the actuator, the first PMOS transistor of the forward linear driver and the forward PMOS transistor of the H-bridge circuit configure a current mirror circuit, and
wherein during the reverse driving of the actuator, the second PMOS transistor of the reverse linear driver and the reverse PMOS transistor of the H-bridge circuit configure a current mirror circuit.

14. The apparatus as set forth in claim 13,
wherein the magnitude of the forward driving current flowing in the actuator is in proportion to a ratio of a resistance value of the first resistor to a resistance value of the second resistor, and to a ratio of a gate width of the forward PMOS transistor to a gate width of the first PMOS transistor, and
wherein the magnitude of the reverse driving current flowing in the actuator is in proportion to a ratio of a resistance value of the third resistor to a resistance value of the fourth resistor, and to a ratio of a gate width of the reverse PMOS transistor to a gate width of the second PMOS transistor.

15. The apparatus as set forth in claim 1, wherein the mobile device comprises one of: a smart phone, a tablet PC, or a camera.

* * * * *